quot;AWS Advent 2014—Finding AWS Resources across Regions,

(12) United States Patent
Pogrebinsky et al.

(10) Patent No.: US 10,523,591 B2
(45) Date of Patent: Dec. 31, 2019

(54) DISCOVERING RESOURCE AVAILABILITY ACROSS REGIONS

(71) Applicant: Microsoft Technology Licensing, LLC, Redmond, WA (US)

(72) Inventors: Vladimir Pogrebinsky, Redmond, WA (US); Ryan D. Jones, Seattle, WA (US); Sworupini Sureshkumar, Seattle, WA (US); Stephen C. Siciliano, Bellevue, WA (US); Charles Lamanna, Bellevue, WA (US); Yang Liu, Sammamish, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 688 days.

(21) Appl. No.: 14/963,078

(22) Filed: Dec. 8, 2015

(65) Prior Publication Data
US 2017/0163564 A1 Jun. 8, 2017

(51) Int. Cl.
*H04L 12/911* (2013.01)
*H04L 29/08* (2006.01)
(Continued)

(52) U.S. Cl.
CPC ............ *H04L 47/822* (2013.01); *H04L 67/16* (2013.01); *G06F 9/45558* (2013.01); *H04L 67/10* (2013.01)

(58) Field of Classification Search
CPC ...... H04L 47/822; H04L 67/16; G06F 9/5072
See application file for complete search history.

(56) References Cited

U.S. PATENT DOCUMENTS 8,918,513 B2 12/2014 Vendrow
2004/0249908 A1* 12/2004 Valladares ........ H04L 29/12113
709/221

(Continued)

FOREIGN PATENT DOCUMENTS

WO 2012167113 A1 12/2012

OTHER PUBLICATIONS

"AWS Advent 2014—Finding AWS Resources across Regions, Services, and Accounts with Skew", 6 pages, Published on: Dec. 14, 2014 Available at: http://awsadvent.tumblr.com/post/105218697613/aws-advent-2014-finding-aws-resources-across.

(Continued)

*Primary Examiner* — Dhairya A Patel
*Assistant Examiner* — Clifton Houston
(74) *Attorney, Agent, or Firm* — Liang IP, PLLC

(57) ABSTRACT

Examples of the disclosure enable an availability of a resource to be discovered across regions. In some examples, a template is received from a client device. The template includes a plurality of parameters associated with a plurality of products. Based on a client location associated with the client device, a resource is identified, and, based on a first parameter, it is determined whether the identified resource is associated with the product. In response to determining that the resource is associated with the product, a feature associated with the resource is identified, and it is determined whether the identified feature satisfies the first parameter. In response to determining that the feature satisfies the first parameter, data associated with the resource is transmitted to the client device for presentation to a user. Aspects of the disclosure enable a computing device to manage one or more resources.

18 Claims, 7 Drawing Sheets

(51) Int. Cl.
*H04L 29/06* (2006.01)
*G06F 9/455* (2018.01)

(56) References Cited

U.S. PATENT DOCUMENTS

| | | | |
|---|---|---|---|
| 2008/0080552 A1* | 4/2008 | Gates | H04L 12/66 370/468 |
| 2011/0231899 A1 | 9/2011 | Pulier et al. | |
| 2011/0320605 A1* | 12/2011 | Kramer | H04L 41/0843 709/226 |
| 2012/0072597 A1* | 3/2012 | Teather | G06F 9/5072 709/226 |
| 2012/0198073 A1* | 8/2012 | Srikanth | G06F 9/5027 709/226 |
| 2013/0124712 A1 | 5/2013 | Parker | |
| 2014/0012988 A1* | 1/2014 | Kruempelmann | H04L 67/1036 709/226 |
| 2014/0052768 A1 | 2/2014 | Deng et al. | |
| 2014/0068075 A1 | 3/2014 | Bonilla et al. | |
| 2014/0189703 A1 | 7/2014 | Gilder et al. | |
| 2014/0201642 A1 | 7/2014 | Vicat-Blanc | |
| 2014/0245141 A1 | 8/2014 | Yeh et al. | |
| 2014/0280977 A1* | 9/2014 | Martinez | H04L 41/5032 709/226 |
| 2014/0297874 A1* | 10/2014 | Matsubara | H04L 47/70 709/226 |
| 2014/0372220 A1* | 12/2014 | Peterson | G06Q 50/01 705/14.55 |
| 2015/0006733 A1* | 1/2015 | Khan | H04L 47/70 709/226 |
| 2015/0032817 A1 | 1/2015 | Garg et al. | |
| 2015/0149642 A1* | 5/2015 | Cormie | H04L 47/783 709/226 |
| 2015/0222694 A1 | 8/2015 | Pandey et al. | |
| 2015/0229645 A1 | 8/2015 | Keith et al. | |
| 2015/0295785 A1* | 10/2015 | Fan | H04L 41/5003 709/203 |
| 2016/0275577 A1* | 9/2016 | Kolluri Venkata Sesha | G06F 16/954 |

OTHER PUBLICATIONS

Mackenzie, Neil, "Creating Azure VMs with ARM PowerShell Cmdlets", 6 pages, Published on: May 5, 2015 Available at: http://blogs.msdn.com/b/cloud_solution_architect/archive/2015/05/05/creating-azure-vms-with-arm-powershell-cmdlets.aspx.

Kaffen, Aaron, "[Webinar] Optimize your AWS Costs and Usage with Cloudability", 3 pages, Published on: Feb. 7, 2013 Available at: http://blog.cloudability.com/webinar-optimize-your-aws-usage-and-costs-with-cloudability/.

"International Search Report and Written Opinion Received for PCT Application No. PCT/US2016/064316", dated Feb. 28, 2017, 12 pages.

* cited by examiner

DISCOVERING RESOURCE AVAILABILITY ACROSS REGIONS

BACKGROUND

Known cloud computing devices provide a variety of computing, networking, and/or storage services over a network (e.g., the Internet). Cloud services may be available, for example, at a remote computing device coupled to the network. From a client perspective, cloud services appear to be provided from a single source (e.g., the "Cloud"). However, applications and programs that are implemented to provide cloud services may be distributed across a plurality of resources (e.g., servers, virtual machines).

In a distributed environment, at least some constraints may be dynamic based on various factors. For example, a cloud service may have a plurality of pricing tiers. Moreover, a cost associated with a cloud service may vary across geographic regions. Furthermore, at least some cloud services may not be available for all user types and/or in all geographic regions. Accordingly, setting up a resource in the cloud, and determining a cost associated with the resource, may be a complicated and/or error-prone process.

SUMMARY

Examples of the disclosure enable an availability of one or more resources to be discovered across regions in an efficient and effective manner. In some examples, a template is received from a client device. The template may include a plurality of parameters associated with a plurality of products. Based on a client location associated with the client device, a resource is identified. It may be determined that the identified resource is associated with at least one product based on a first parameter of the plurality of parameters. In response to determining that the resource is associated with at least one product, a feature associated with the resource is identified. It may be determined that the identified feature satisfies the first parameter. In response to determining that the feature satisfies the first parameter, data associated with the resource is transmitted to the client device for presentation to a user.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

BRIEF DESCRIPTION OF THE DRAWINGS

Corresponding reference characters indicate corresponding parts throughout the drawings.

DETAILED DESCRIPTION

Figure 1:
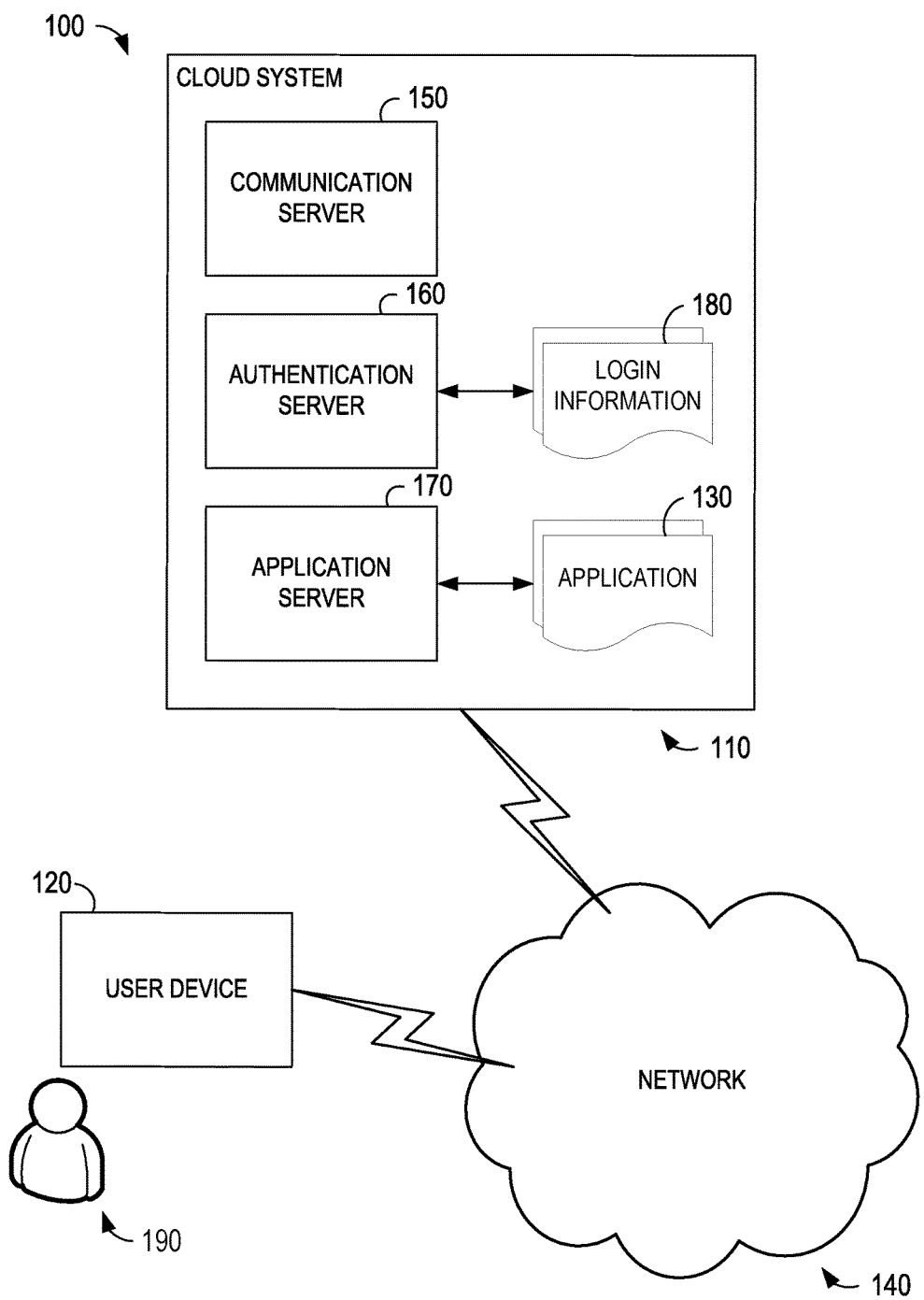
FIG. 1 is a block diagram of an example environment including a user device coupled to a cloud system.

The subject matter described herein is related generally to the management of cloud services and, more particularly, to automatically discovering resource availability across regions. In some examples, an application programming interface (API) implemented across a plurality of cloud services enables a product to be described with one or more possible stockkeeping units (SKUs), one or more meters that map the one or more possible SKUs to at least one constraint (e.g., overhead, cost), and an availability of the one or more possible SKUs across various regions. For example, a SKU may be created and/or modified by a user to facilitate discovering resource availability across regions. In some examples, a template including a plurality of parameters associated with a plurality of products is received. A resource may be identified based on a client location, and, based on a parameter, it may be determined that the resource is associated with the product. In response to determining that the resource is associated with the product, a feature associated with the resource is identified. It may be determined that the feature satisfies the parameter, and, in response to determining that the feature satisfies the parameter, data associated with the resource may be transmitted for presentation to a user.

The examples described herein enable an API implemented across a plurality of cloud services to enable a user to manage the plurality of cloud services. For example, the examples described herein may enable identifying one or more resources associated with the cloud services, and transmitting data associated with the resources for presentation to a user. The examples described herein may be implemented using computer programming or engineering techniques including computing software, firmware, hardware, or a combination or subset thereof. Aspects of the disclosure enable an availability of one or more resources to be discovered across regions in a calculated and systematic manner for increased performance. For example, one or more resources may be identified for a template including a plurality of parameters associated with a plurality of products. The methods and systems described herein facilitate identifying a combination of resources configured to provide the plurality of products in accordance with the plurality of parameters.

The methods and systems described herein provide a hosted desktop environment that provides scalable, streamlined, and homogenous computing environments efficiently and effectively. The examples described herein manage one or more operations or computations associated with discovering resource availability across regions. By discovering resource availability across regions in the manner described in this disclosure, some examples reduce processing load and/or increase processing speed by systematically evaluating resources that may be used to provide one or more products. Additionally, some examples may conserve memory, reduce network bandwidth usage, improve operating system resource allocation, and/or improve communication between computing devices by streamlining at least some operations, improve user efficiency and/or user interaction performance via user interface interaction, and/or reduce error rate by automating at least some operations.

FIG. 1 is a block diagram of an example environment 100 including a cloud system 110 and a user device 120 coupled to the cloud system 110. The user device 120 may, for example, communicate with the cloud system 110 to access one or more applications or "apps" 130 (e.g., web app, mobile app, logic app, application programming interface (API) app) to perform one or more tasks. In some examples, the environment 100 includes one or more cloud systems 110, and the user device 120 may be coupled to the one or more cloud systems 110 via one or more networks 140. Example networks 140 include a personal area network, a local area network, a wide area network, a cellular or mobile network, and the Internet. Alternatively, the network 140 may be any communication medium that enables the cloud system 110 to communicate with the user device 120 and/or with another cloud system 110.

The cloud system 110 is configured to perform one or more operations. For example, the cloud system 110 may include and/or have access to a communication server 150, an authentication server 160, and/or an application server 170. In some examples, the communication server 150 is configured to control communication between one or more computing devices (e.g., cloud system 110, communication server 150, authentication server 160, application server 170) and the user device 120. Communication between the cloud system 110 and the user device 120 may occur using any protocol or mechanism over any wired or wireless connection. For example, the cloud system 110 may communicate with the user device 120 via the network 140.

The user device 120 may initiate a request to the cloud system 110 (e.g., via the communication server 150) to generate, modify, and/or access one or more applications 130. For example, the user device 120 may access data associated with the cloud system 110 to perform one or more operations. In some examples, the authentication server 160 is configured to manage, store, and/or have access to registered login information 180 (e.g., identification, password), and, based on the registered login information 180, determine whether the user device 120 or a user 190 associated with the user device 120 is authorized to access data associated with the cloud system 110. For example, the registered login information 180 may be associated with a registered user device and/or a registered user authorized to access data associated with the cloud system 110 (e.g., a whitelist). Additionally or alternatively, the registered login information 180 may be associated with a registered user device and/or a registered user not authorized to access data associated with the cloud system 110 (e.g., a blacklist).

The authentication server 160 may receive user input (e.g., identification, password) from the user device 120 (e.g., via the communication server 150), and compare the received user input with the registered login information 180 to determine whether the user device 120 or user 190 is authorized to access data associated with the cloud system 110. For example, upon determining that the received user input matches or corresponds to registered login information 180 associated with a whitelist, the authentication server 160 determines that the user device 120 is authorized to access data associated with the cloud system 110 and selectively allows the user device 120 to access data associated with the cloud system 110. On the other hand, upon determining that the received user input matches or corresponds to registered login information 180 associated with a blacklist or does not match or correspond to registered login information 180, the authentication server 160 determines that the user device 120 is not authorized to access data associated with the cloud system 110 and selectively restricts the user device 120 from accessing data associated with the cloud system 110.

The authentication server 160 may transmit a security token (e.g., single sign-on (SSO) token, reduced sign-on (RSO) token) to the user device 120 (e.g., via the communication server 150). The security token is configured to allow the user device 120 to access data associated with one or more computing devices (e.g., cloud system 110, communication server 150, authentication server 160, application server 170) without providing user input for each computing device. In some examples, the user device 120 and/or user 190 may be authorized to access (or restricted from accessing) one or more computing devices and/or perform one or more operations based on a role associated with the user device 120 and/or user 190 (e.g., administrator, author, user, writer, reader, parent, child).

In some examples, the application server 170 is configured to manage and/or store one or more applications 130 and communicate with the user device 120 (e.g., via the communication server 150) to allow the user 190 to generate, modify, and/or access one or more applications 130 using the user device 120. The application 130 may be configured to perform one or more operations and may include any combination of computing software, firmware, hardware, or a combination or subset thereof. For example, the application 130 may be configured to present an image or a series of images (e.g., a video) on a display, play audio, and/or send a service call to access data associated with another computing device (e.g., cloud system 110).

Figure 2:
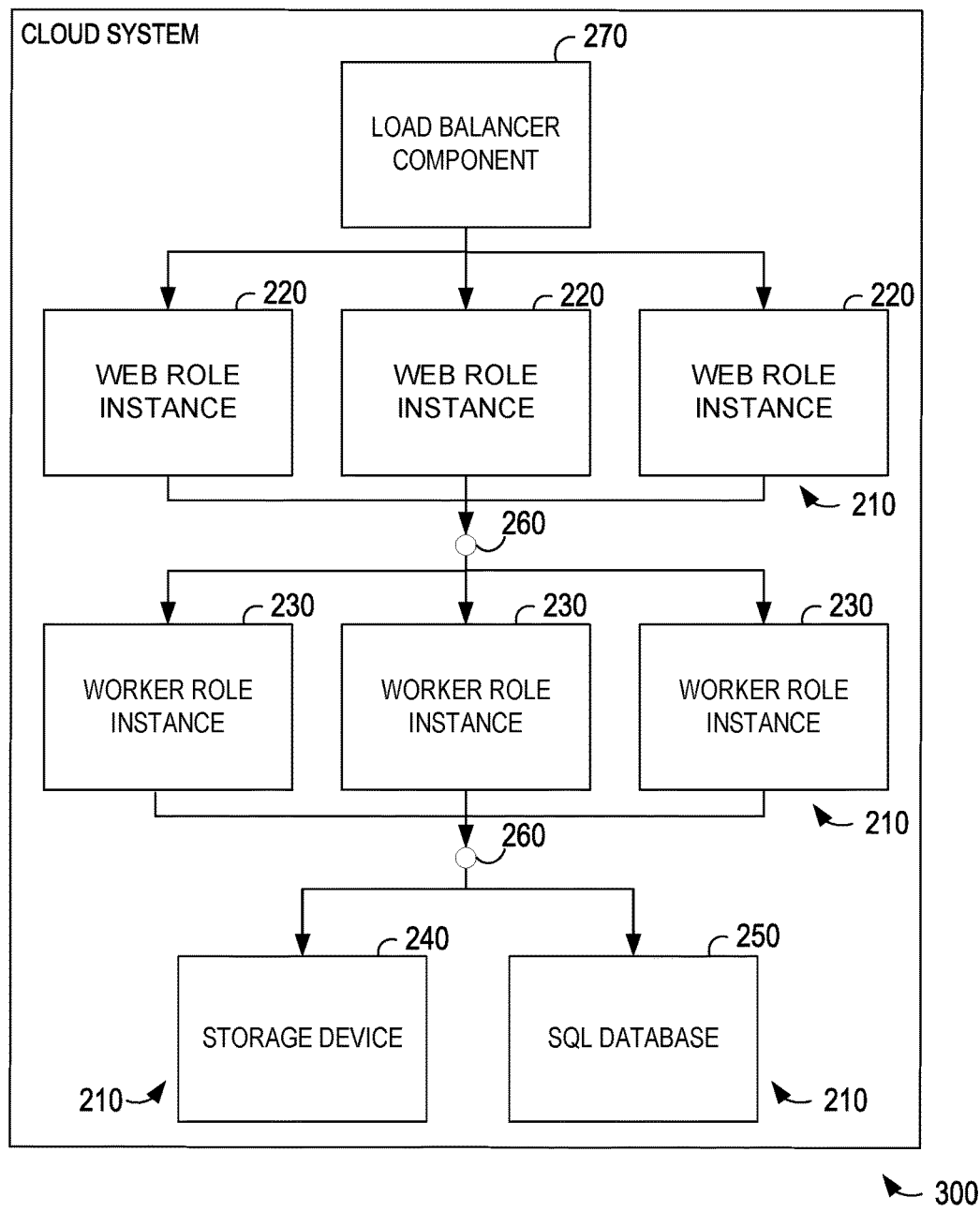
FIG. 2 is a block diagram of an example cloud system.

FIG. 2 is a block diagram of the cloud system 110 including one or more resources 210 (e.g., a database server, a database, a website) that are configured to execute at least a portion of the application 130. The application 130 may utilize one or more resources 210 to provide a product (e.g., cloud services), such as on-demand compute and storage capabilities to host, scale, and/or manage the application 130. A resource 210 is a discrete scalable component built with managed code. For example, a resource 210 may be associated with a web role instance 220 that listens and responds to a web request and/or a worker role instance 230 for generalized development. The web request may be communicated, for example, via a hypertext transfer protocol (HTTP) or HTTP secure (HTTPS) endpoint. The web role instance 220 may provide a web interface through which aspects of its operation may be configured through the use of a web browser application program executing on the user device 120. Alternatively, a stand-alone application program executing on the user device 120 may access an application programming interface (API) exposed by the resource 210 for performing the configuration operations. Other mechanisms for configuring the operation of the resource 210, including deploying updates to an application 130, may also be utilized. A resource 210 may have access to one resources 210 including, for example, a storage device 240 and/or a structure query language (SQL) database 250 via one or more internal network nodes 260.

In some examples, a load balancer component 270 is configured to distribute network or application traffic across a number of resources 210. A resource 210 may be available as a virtual machine instance or as a physical computing device configured to run one or more virtual machines. A virtual machine instance may be an instance of a software implementation of a machine (e.g., a computer) that executes programs much like a physical machine executes programs. In the example of virtual machine instances, a resource 210 may be configured to execute an instance manager capable of executing the instances. The instance manager might be a hypervisor or another type of program configured to enable the execution of multiple processes on a single resource 210, for example.

It should be appreciated that although some of the embodiments disclosed herein are discussed in the context of virtual machine instances, other types of instances can be utilized with the concepts and technologies disclosed herein. For example, the technologies disclosed herein might be utilized with instances of storage resources, processing resources, data communications resources, and with other types of resources. The embodiments disclosed herein might also be utilized with computing systems that do not utilize virtual machine instances, e.g., that use a combination of physical machines and virtual machines.

Figure 3:
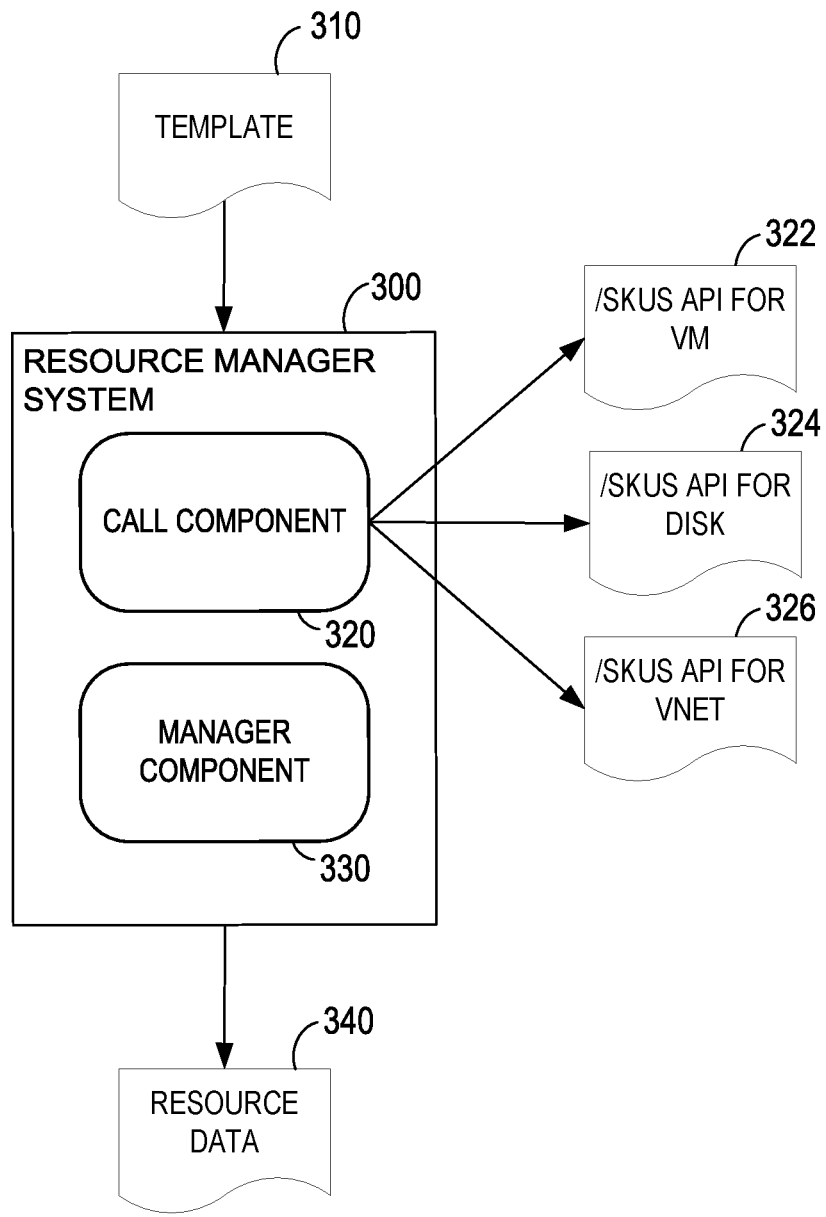
FIG. 3 is a block diagram of an example resource manager system that may be used to discover resource availability across regions.

FIG. 3 is a block diagram of an example resource manager system 300 that may be used to manage one or more resources 210. For example, the resource manager system 300 may identify one or more resources 210 associated with a product (e.g., cloud services), and determine one or more regions (e.g., data centers) in which the one or more resources 210 are available for deployment.

The resource manager system 300 provides an interface for communicating an available product, one or more regions in which a product is available, a SKU supported in the one or more regions, and/or a meter associated with the SKU. For example, the interface may provide one or more available products, one or more SKUs associated with the available products, one or more meters associated with the SKUs, and/or an availability of the SKUs in one or more regions. In some examples, the resource manager system 300 generates a meter for a SKU or a set of SKUs based on one or more constraints (e.g., overhead, cost, performance requirements) associated with the SKU or set of SKUs. For example, the meter may map one or more constraints between a client location associated with the client device (e.g., a first region) and a resource location associated with a resource 210 (e.g., a second region). In this manner, the resource manager system 300 may communicate a location in which a product may be provided and/or a cost associated with deploying one or more resources 210.

A resource 210 may be assigned or associated with a set of properties (e.g., an identifier, a resource location, a name, a type, a SKU). The SKU may be assigned, for example, based on one or more features or capabilities associated with the resource 210. For example, a first SKU may be associated with one or more first resources 210 having the same or similar features, and a second SKU may be associated with one or more second resources 210 having features that are different from those of the first resources 210. In some examples, a service administrator may create and/or modify a SKU and/or select which SKUs are available to which customers (e.g., via plans, quotas, and/or offers). A SKU may be associated with various fields including, without limitation, a name, a tier (e.g., free, basic, standard, premium), a size, a family, and/or a capacity. In this manner, a cost and/or availability of one or more SKUs may be automatically determined for providing a product.

For example, to discover possible SKUs at a given location, a user may call the API at the top level: https:// . . . subscriptions/ {subscriptionID}/providers/{resource provider}/locations/{location name}/skus?api-version={api-version}. Alternatively, if the resource 210 is already created, a user may call the API underneath the resource identifier: https:// . . . subscriptions/{subscriptionID}/resourceGroups/{group name}/providers/{resource provider}/{resourceType}/{resource name}/skus?api-version={api-version}.

As shown in FIG. 3, a template 310 (e.g., a first template) may be received from a client device (e.g., user device 120). The template 310 may include a list of resources 210 associated with one or more products. For example, the list of resources 210 may include one or more virtual machines (VMs), one or more disks, and one or more virtual networks (vNets). In some examples, the template 310 may include and/or identify a plurality of parameters associated with the products. The resource manager system 300 includes a call component 320 configured to identify one or more resources 210 configured to provide a product. For example, based on the template 310, the call component 320 may identify one or more resources configured to provide cloud services in accordance with the parameters. In some examples, the call component 320 identifies one or more resource providers and generates one or more calls for the resource providers. For example, in the example illustrated in FIG. 3, the call component 320 farms out a first call to a VM, a second call to a disk, and a third call to a vNet to receive data associated with one or more resources 210. Alternatively, the call component 320 may identify the one or more resource providers and retrieve the data associated with one or more resources 210 from the resource providers. In some examples, the resource manager system 300 stores, in a cache (e.g., storage device 240), the data associated with the one or more resources 210 after receiving and/or retrieving the data.

The resource manager system 300 includes a manager component 330 configured to manage the resources 210. For example, for each resource 210, the manager component 330 may identify one or more regions in which the resource 210 is available. Additionally or alternatively, for each region, the manager component 330 may identify one or more SKUs available in one or more regions. In some examples, a first resource 210 is identified based on a client location associated with the client device. For example, the first resource 210 may be identified in response to determining that a resource location associated with the first resource 210 is accessible to the client device.

Based on a first parameter, the manager component 330 may determine whether the first resource 210 is associated with the product. In response to determining that the first resource 210 is associated with the product, the manager component 330 may identify a feature associated with the first resource 210. In some examples, a recommendation identifying where one or more resources 210 may be deployed is generated. Upon determining that the feature associated with the first resource 210 satisfies the first parameter, data associated with the first resource 210 is transmitted to the client device for presentation to a user. In this manner, the resource manager system 300 is configured to communicate a set of available options by determining which capabilities are required to deploy an application 130, which capabilities are available in which regions (e.g., data centers), and which regions are associated with a combination of SKUs configured to deploy the application 130.

In some examples, another template 310 (e.g., a second template) including and/or identifying a second plurality of parameters associated with the plurality of products may be received. In some examples, it may be determined whether each resource 210 associated with the plurality of products has been previously deployed. When a resource 210 (e.g., a second resource) associated with the plurality of products has not been previously deployed, data associated with the second resource 210 may be received and/or retrieved from a resource provider associated with the second resource 210. On the other hand, when the second resource 210 has been previously deployed, data associated with the second resource 210 may be received and/or retrieved from the cache storing the data. In some examples, a resource 210 associated with cached data may not be configured to satisfy the second plurality of parameters. In such examples, data associated with the second resource 210 may be received and/or retrieved from a resource provider associated with the second resource 210.

In some examples, one or more SKUs may be generated in a consistent manner across a plurality of resource providers by using a consistent API across the resource providers. For example, a new SKU may be generated for a resource provider by calling the API: https:// . . . subscriptions/{serviceProviderSubscriptionID}/providers/{resource provider}/locations/{location name}/skus with one or more expressions. The resource provider may then take the call and validate the expressions as appropriate before generating the new SKU resource. Accordingly, a user (e.g., a service administrator) may offer differentiated SKUs and pricing tiers in their own cloud offerings.

Additionally or alternatively, one or more SKUs may be associated with a quota or plan that enables a first user to have access to at least some SKUs (or, conversely, restrict a second user from having access to the SKUs). When a user (e.g., an end user) calls an API that is already mentioned in a document https:// . . . subscriptions/{subscriptionID}/providers/{resource provider}/locations/{location name}/skus?api-version={api-version}, the response of the API will reflect which SKUs are available in this location. In some examples, the available SKUs may be based, for example, on the quotas and/or plans associated with the SKUs.

Figure 4:
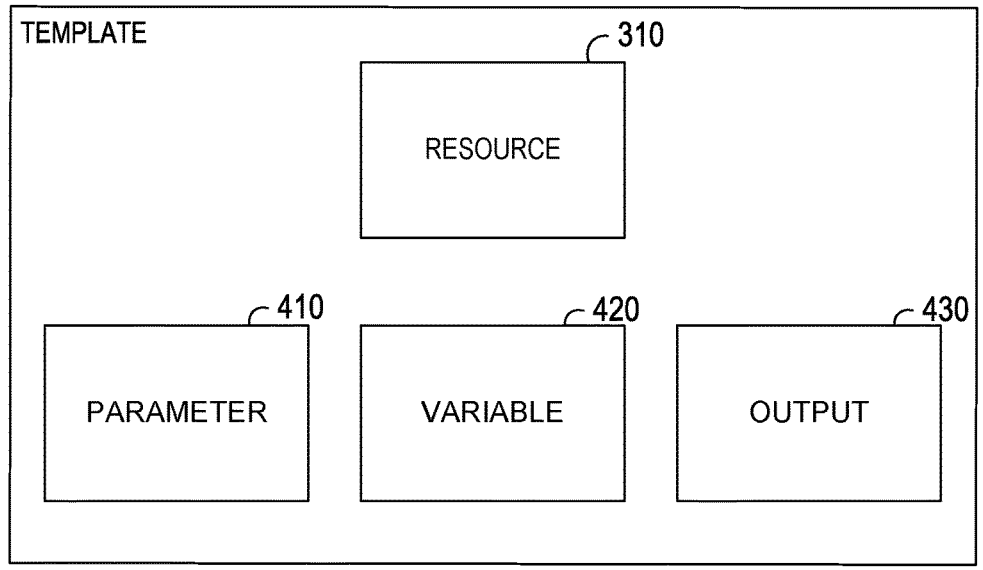
FIG. 4 is a block diagram of an example template that may be used with a cloud system, such as the resource manager system shown in FIG. 3.

FIG. 4 is a block diagram of a template 310 that may deploy and provision one or more resources 210 for an application 130 in a single, coordinated operation. The template 310 identifies one or more resources 210 to deploy and/or update for executing the application 130. For example, the template 310 may define an infrastructure for the application 130, a configuration of the infrastructure, and/or a publication of application code for the infrastructure. The template 310 may include, for example, one or more parameters 410 that set values for deployed resources 210, one or more variables 420 that simplify template language expressions, and/or one or more outputs 430 returned from deployment. The template 310 may be used for different environments, such as testing, staging, and/or production. For example, various parameters 410 may be specified to input values for different environments. The template 310 may include, for example, JavaScript Object Notation (JSON) and expressions to construct values for deployment. Resource capabilities include, for example, web application hosting services, data storage services, and/or modeling services.

When a template 310 identifies a resource 210, in some examples, it may be determined whether the resource 210 has been previously deployed. If the resource 210 has not been previously deployed, a new resource 210 may be added to the application 130. On the other hand, if the resource 210 has been previously deployed, the previously-deployed resource 210 may be updated. For example, configuration rules for the previously-deployed resource 210 may be added.

Figure 5:
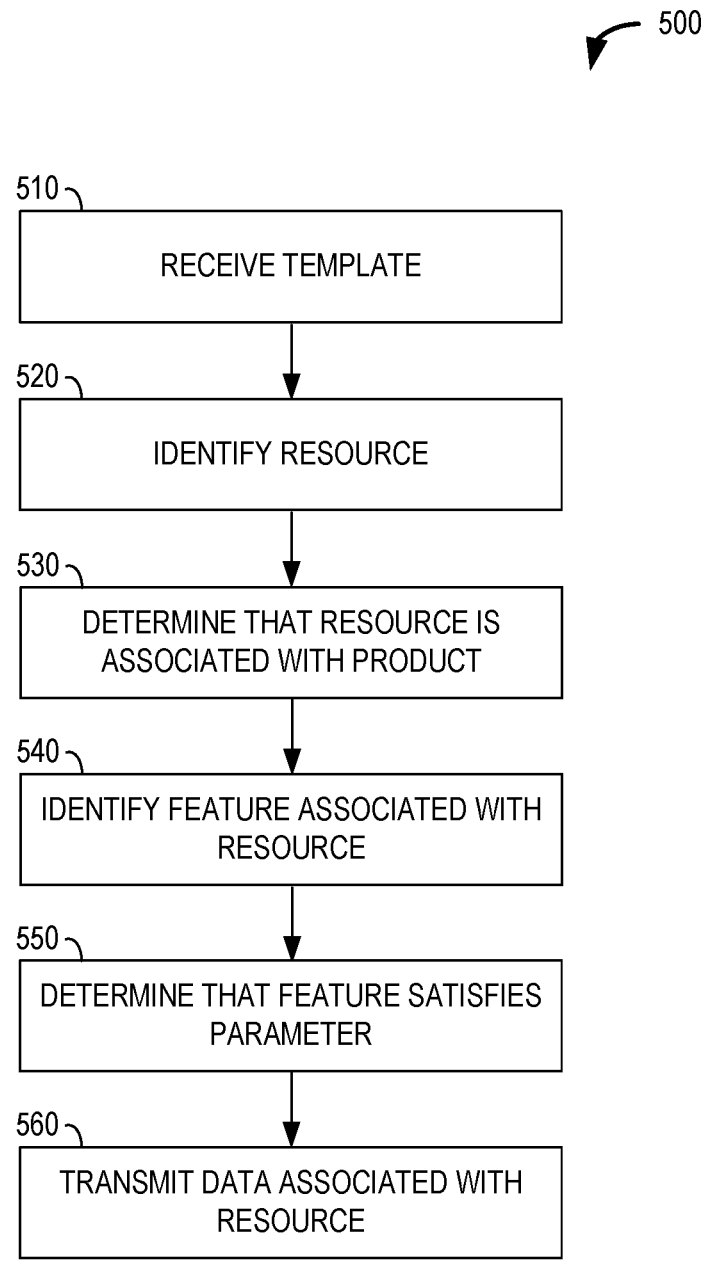
FIGS. 5 and 6 are flowcharts of an example method for discovering resource availability across regions using a cloud system, such as the resource manager system shown in FIG. 3.

FIG. 5 is a flowchart of an example method 500 including a plurality of operations to provide data associated with one or more resources for presentation to a user using a computing device (e.g., resource manager system 300). At 510, a template 310 is received from a client device (e.g., user device 120). The template 310 may include a plurality of parameters 410 associated with a plurality of products (e.g., cloud services). The parameters 410 may, for example, set or establish one or more values or ranges of values for a corresponding resource 210.

A resource 210 is identified at 520 based on a client location associated with the client device. For example, the resource manager system 300 may identify the resource 210 based on a determination that the resource 210 is accessible to the client device. The resource 210 may be determined to be accessible to the client device based on a client location, a resource location, and/or an authentication of the client device. Based on at least one parameter 410, it may be determined at 530 that the resource 210 is associated with the product. For example, the resource manager system 300 may determine that the resource 210 is associated with the product based on a determination that the resource 210 is configured to provide at least a portion of the cloud services.

At 540, a feature associated with the resource 210 is identified. The resource 210 may include or be associated with one or more features. At least one feature may be identified, for example, in response to determining that the resource 210 is associated with the product. It is determined at 550 that the feature satisfies at least one parameter 410 included in the template 310. In response to determining that the feature satisfies the parameter 410, data associated with the resource 210 is transmitted at 560 for presentation to a user of the client device.

Figure 6:
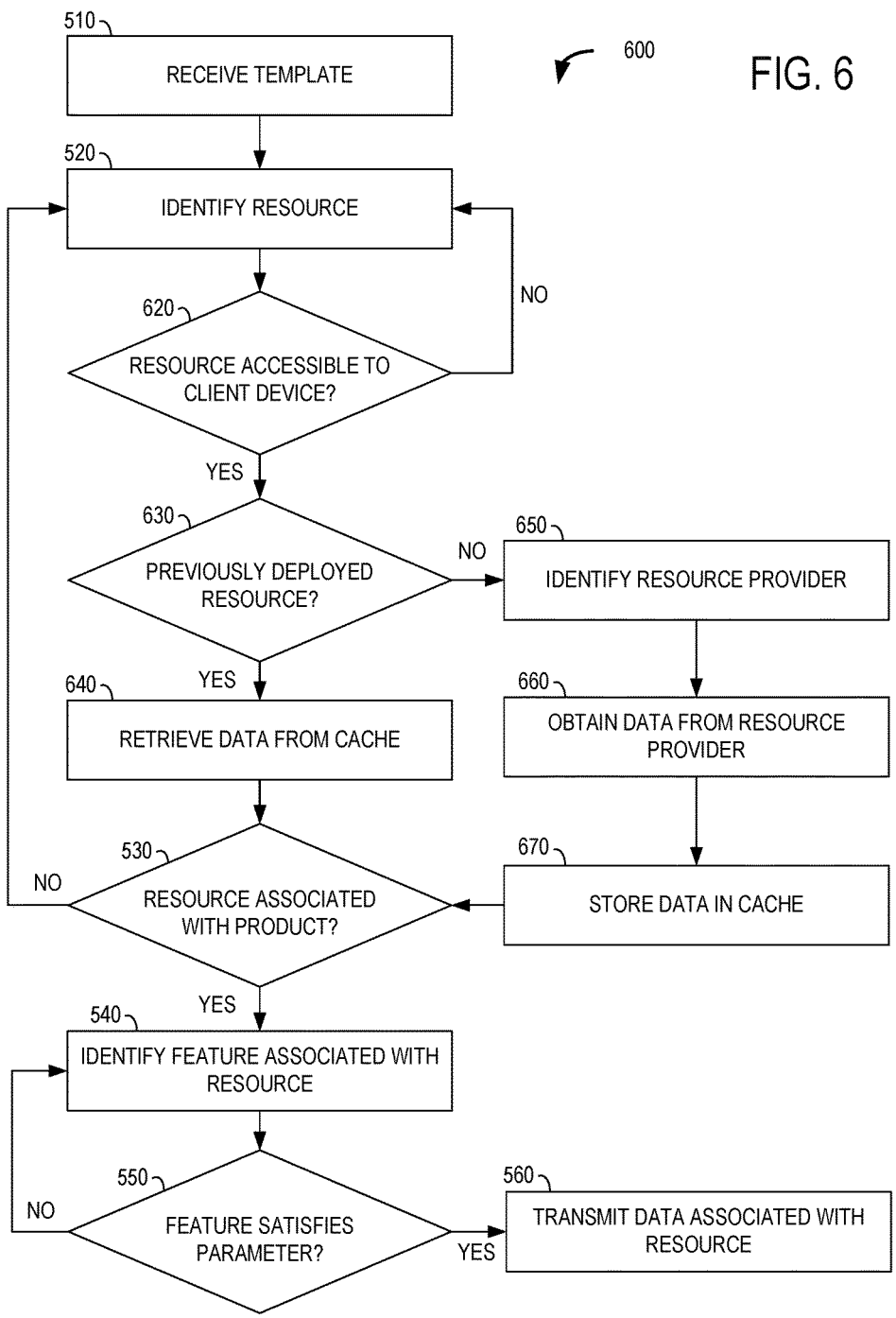

FIG. 6 is a detailed flowchart of the method 500. A plurality of resources 210 are associated with a plurality of SKUs. For example, a first SKU may be associated with one or more first resources 210 having a first set of features, and a second SKU may be associated with one or more second resources 210 having a second set of features different from the first set of features. Each SKU may be associated with a meter that maps one or more constraints (e.g., overhead, cost, performance requirements) associated with a corresponding resource 210. The SKUs enable the resource manager system 300 to manage one or more resources in an effective and efficient manner.

At 510, a request for a product (e.g., cloud services) may be received from a client device (e.g., user device 120). For example, the request for a product may include a template 310 including a plurality of parameters 410 associated with one or more products. In some examples, at least one resource 210 in the cloud system 110 is identified at 520, and it is determined at 620 whether the resource 210 is accessible to the client device. In some examples, the resource 210 is identified based at least in part on a client location associated with the client device, a resource location associated with the resource 210, and/or an authentication of the client device. If the resource 210 is not accessible to the client device, another resource 210 in the cloud system 110 is identified. If the resource 210 is accessible to the client device, data associated with the resource 210 may be obtained.

To obtain data associated with the resource 210, it may be determined at 630 whether the resource 210 is a previously-deployed resource. If the resource 210 had been previously deployed, then data associated with the resource 210 may be retrievable at 640 from a cache. On the other hand, if the resource 210 had not been previously deployed (e.g., it is the first time the resource 210 has been called) or the data is not retrievable from the cache, then a resource provider corresponding to the resource 210 may be identified at 650. The data may be obtained at 660 from the resource provider and stored in cache at 670. For example, a call for data may be generated, and the data may be received from the resource provider.

Based on the data associated with the resource 210, it may be determined at 530 whether the resource 210 is associated with the requested product. For example, it may be determined whether the resource 210 is configured to at least partially satisfy the request for the product in accordance with the parameters 410. If the resource 210 is not associated with the product, another resource 210 in the cloud system 110 may be identified. On the other hand, if the resource 210 is associated with the product, a feature associated with the resource 210 is identified at 540. At 550, it is determined whether the feature satisfies at least one parameter 410 included in the template 310. If the feature does not satisfy the parameter 410, then another feature may be identified. On the other hand, if the feature satisfies the parameter 410, then data associated with the resource 210 is transmitted at 560 for presentation to a user of the client device such that the resource is selectable at the client device. Upon selection, the resource 210 may be deployed to at least partially satisfy the request for the product.

Figure 7:
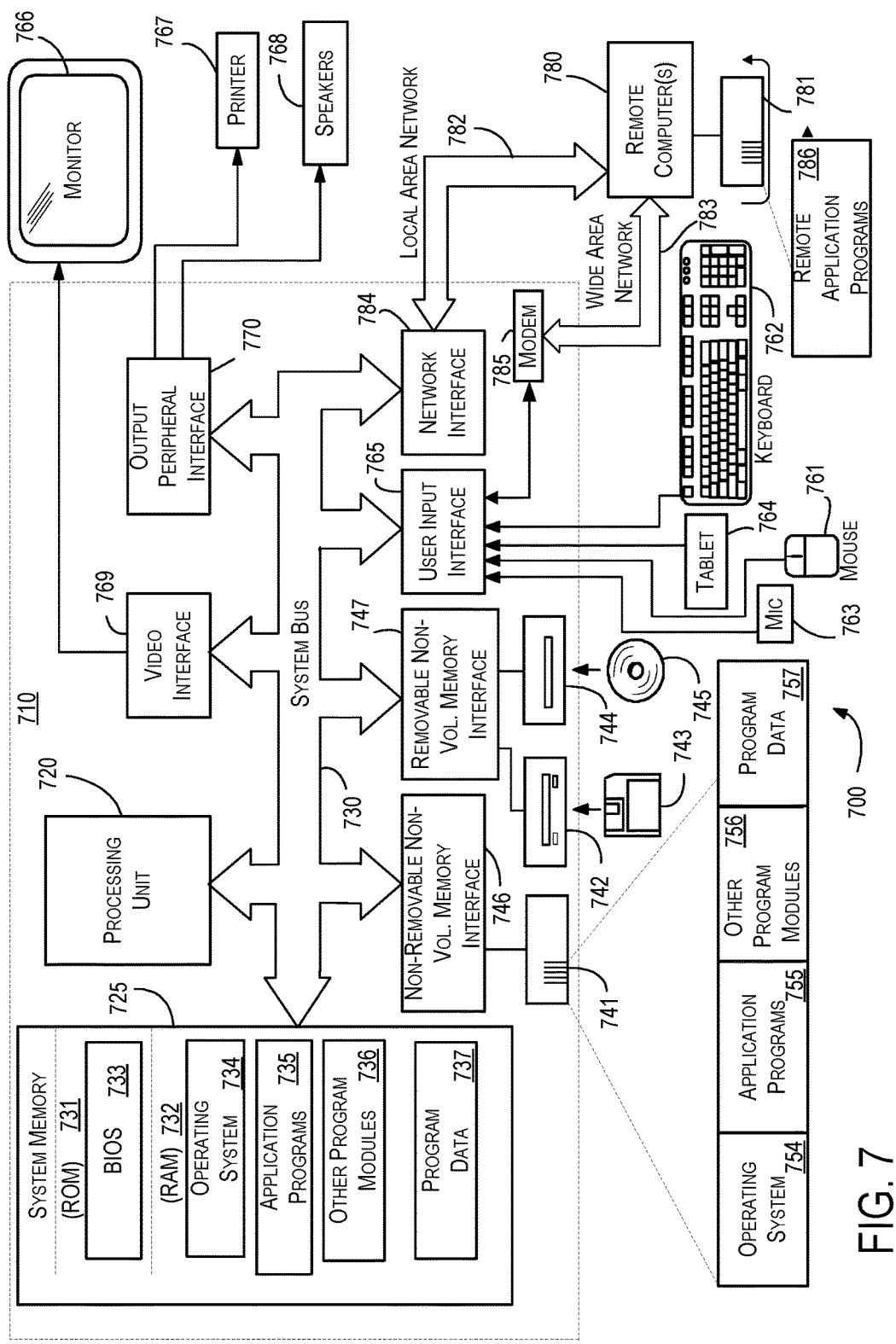
FIG. 7 is a block diagram of an example computing device that may be used to discover resource availability across regions.

FIG. 7 is a block diagram of an example operating environment 700 that may be used to manage one or more resources 210 in the environment 100 (shown in FIG. 1). The operating environment 700 is only one example of a computing and networking environment and is not intended to suggest any limitation as to the scope of use or functionality of the disclosure. The operating environment 700 should not be interpreted as having any dependency or requirement relating to any one or combination of components illustrated in the example operating environment 700.

The disclosure is operational with numerous other computing and networking environments or configurations. While some examples of the disclosure are illustrated and described herein with reference to the operating environment 700 being or including a resource manager system 300 (shown in FIG. 3), aspects of the disclosure are operable with any computing device (e.g., cloud system 110, user device 120, communication server 150, authentication server 160, application server 170, web role instance 220, worker role instance 230, storage device 240, SQL database 250, internal network node 260, load balancer component 270) that executes instructions to implement the operations and functionality associated with the operating environment 700.

For example, the operating environment 700 may include a mobile device, a mobile telephone, a phablet, a tablet, a portable media player, a netbook, a laptop, a desktop computer, a personal computer, a server computer, a computing pad, a kiosk, a tabletop device, an industrial control device, multiprocessor systems, microprocessor-based systems, set top boxes, programmable consumer electronics, network computers, minicomputers, mainframe computers, distributed computing environments that include any of the above systems or devices, and the like. The operating environment 700 may represent a group of processing units or other computing devices. Additionally, any computing device described herein may be configured to perform any operation described herein including one or more operations described herein as being performed by another computing device.

With reference to FIG. 7, an example system for implementing various aspects of the disclosure may include a general purpose computing device in the form of a computer 710. Components of the computer 710 may include, but are not limited to, a processing unit 720, a system memory 725, and a system bus 730 that couples various system components including the system memory 725 to the processing unit 720. The system bus 730 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

The system memory 725 includes any quantity of media associated with or accessible by the processing unit 720. For example, the system memory 725 may include computer storage media in the form of volatile and/or nonvolatile memory such as read only memory (ROM) 731 and random access memory (RAM) 732. The ROM 731 may store a basic input/output system 733 (BIOS) that facilitates transferring information between elements within computer 710, such as during start-up. The RAM 732 may contain data and/or program modules that are immediately accessible to and/or presently being operated on by processing unit 720. For example, the system memory 725 may store computer-executable instructions, communication data, authentication data, application data, and other data.

The processing unit 720 may be programmed to execute the computer-executable instructions for implementing aspects of the disclosure, such as those illustrated in the figures (e.g., FIGS. 5 and 6). By way of example, and not limitation, FIG. 7 illustrates operating system 734, application programs 735, other program modules 736, and program data 737. The processing unit 720 includes any quantity of processing units, and the instructions may be performed by the processing unit 720 or by multiple processors within the operating environment 700 or performed by a processor external to the operating environment 700.

The system memory 725 may include a call component 320 (shown in FIG. 3) and/or a manager component 330 (shown in FIG. 3). Upon programming or execution of these components, the operating environment 700 and/or processing unit 720 is transformed into a special purpose microprocessor or machine. For example, the call component 320, when executed by the processing unit 720, causes the processing unit 720 to receive a template including a plurality of parameters associated with a plurality of products, identify a resource configured to satisfy at least a portion of a plurality of parameters, and generate a call for data associated with a resource; and the manager component 330, when executed by the processing unit 720, causes the processing unit 720 to identify a feature associated with a resource, determine whether a feature is accessible to a client device, and transmit data associated with a resource for presentation to a user. Although the processing unit 720 is shown separate from the system memory 725, embodiments of the disclosure contemplate that the system memory 725 may be onboard the processing unit 720 such as in some embedded systems.

The computer 710 may also include other removable/non-removable, volatile/nonvolatile computer storage media. By way of example only, FIG. 7 illustrates a hard disk drive 741 that reads from or writes to non-removable, nonvolatile magnetic media, a magnetic disk drive 742 that reads from or writes to a removable, nonvolatile magnetic disk 743 (e.g., a floppy disk, a tape cassette), and an optical disk drive 744 that reads from or writes to a removable, nonvolatile optical disk 745 (e.g., a compact disc (CD), a digital versatile disc (DVD)). Other removable/non-removable, volatile/nonvolatile computer storage media that may be used in the example operating environment include, but are not limited to, flash memory cards, digital video tape, solid state RAM, solid state ROM, and the like. The hard disk drive 741 may be connected to the system bus 730 through a non-removable memory interface such as interface 746, and magnetic disk drive 742 and optical disk drive 744 may be connected to the system bus 730 by a removable memory interface, such as interface 747.

The drives and their associated computer storage media, described above and illustrated in FIG. 7, provide storage of computer-readable instructions, data structures, program modules and other data for the computer 710. In FIG. 7, for example, hard disk drive 741 is illustrated as storing operating system 754, application programs 755, other program modules 756 and program data 757. Note that these components may either be the same as or different from operating system 734, application programs 735, other program modules 736, and program data 737. Operating system 754, application programs 755, other program modules 756, and program data 757 are given different numbers herein to illustrate that, at a minimum, they are different copies.

The computer 710 includes a variety of computer-readable media. Computer-readable media may be any available media that may be accessed by the computer 710 and includes both volatile and nonvolatile media, and removable and non-removable media.

By way of example, and not limitation, computer-readable media may comprise computer storage media and communication media. Computer storage media includes volatile and nonvolatile, removable and non-removable media implemented in any method or technology for storage of information such as computer-readable instructions, data structures, program modules or other data. ROM 731 and RAM 732 are examples of computer storage media. Computer storage media are tangible and mutually exclusive to communication media. Computer storage media for purposes of this disclosure are not signals per se. Example computer storage media includes, but is not limited to, hard disks, flash drives, solid state memory, RAM, ROM, electrically erasable programmable read-only memory (EEPROM), flash memory or other memory technology, CDs, DVDs, or other optical disk storage, magnetic cassettes, magnetic tape, magnetic disk storage or other magnetic storage devices, or any other medium which may be used to store the desired information and which may accessed by the computer 710. Computer storage media are implemented in hardware and exclude carrier waves and propagated signals. Any such computer storage media may be part of computer 710.

Communication media typically embodies computer-readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media.

A user may enter commands and information into the computer 710 through one or more input devices, such as a pointing device 761 (e.g., mouse, trackball, touch pad), a keyboard 762, a microphone 763, and/or an electronic digitizer 764 (e.g., tablet). Other input devices not shown in FIG. 7 may include a joystick, a game pad, a controller, a satellite dish, a camera, a scanner, an accelerometer, or the like. These and other input devices may be coupled to the processing unit 720 through a user input interface 765 that is coupled to the system bus 730, but may be connected by other interface and bus structures, such as a parallel port, game port or a universal serial bus (USB).

Information, such as text, images, audio, video, graphics, alerts, and the like, may be presented to a user via one or more presentation devices, such as a monitor 766, a printer 767, and/or a speaker 768. Other presentation devices not shown in FIG. 7 may include a projector, a vibrating component, or the like. These and other presentation devices may be coupled to the processing unit 720 through a video interface 769 (e.g., for a monitor 766 or a projector) and/or an output peripheral interface 770 (e.g., for a printer 767, a speaker 768, and/or a vibration component) that are coupled to the system bus 730, but may be connected by other interface and bus structures, such as a parallel port, game port or a USB. In some examples, the presentation device is integrated with an input device configured to receive information from the user (e.g., a capacitive touch-screen panel, a controller including a vibrating component). Note that the monitor 766 and/or touch screen panel may be physically coupled to a housing in which the computer 710 is incorporated, such as in a tablet-type personal computer.

The computer 710 may operate in a networked environment using logical connections to one or more remote computers, such as a remote computer 780. The remote computer 780 may be a personal computer, a server, a router, a network PC, a peer device or other common network node, and typically includes many or all of the elements described above relative to the computer 710, although only a memory storage device 781 has been illustrated in FIG. 7. The logical connections depicted in FIG. 7 include one or more local area networks (LAN) 782 and one or more wide area networks (WAN) 783, but may also include other networks. Such networking environments are commonplace in offices, enterprise-wide computer networks, intranets and the Internet.

When used in a LAN networking environment, the computer 710 is coupled to the LAN 782 through a network interface or adapter 784. When used in a WAN networking environment, the computer 710 may include a modem 785 or other means for establishing communications over the WAN 783, such as the Internet. The modem 785, which may be internal or external, may be connected to the system bus 730 via the user input interface 765 or other appropriate mechanism. A wireless networking component such as comprising an interface and antenna may be coupled through a suitable device such as an access point or peer computer to a LAN 782 or WAN 783. In a networked environment, program modules depicted relative to the computer 710, or portions thereof, may be stored in the remote memory storage device. By way of example, and not limitation, FIG. 7 illustrates remote application programs 786 as residing on memory storage device 781. It may be appreciated that the network connections shown are examples and other means of establishing a communications link between the computers may be used.

The block diagram of FIG. 7 is merely illustrative of an example system that may be used in connection with one or more examples of the disclosure and is not intended to be limiting in any way. Further, peripherals or components of the computing devices known in the art are not shown, but are operable with aspects of the disclosure. At least a portion of the functionality of the various elements in FIG. 7 may be performed by other elements in FIG. 7, or an entity (e.g., processor, web service, server, applications, computing device, etc.) not shown in FIG. 7.

The subject matter described herein enables a computing device to determine resource cost and/or availability across regions. For example, data associated with one or more available resources may be presented to provide one or more options for deploying one or more applications. In this way, the computing device may be configured to deploy an application in accordance with one or more parameters.

Although described in connection with an example computing system environment, examples of the disclosure are capable of implementation with numerous other general purpose or special purpose computing system environments, configurations, or devices.

Examples of well-known computing systems, environments, and/or configurations that may be suitable for use with aspects of the disclosure include, but are not limited to, mobile computing devices, personal computers, server computers, hand-held or laptop devices, multiprocessor systems, gaming consoles, microprocessor-based systems, set top boxes, programmable consumer electronics, mobile telephones, mobile computing and/or communication devices in wearable or accessory form factors (e.g., watches, glasses, headsets, or earphones), network PCs, minicomputers, mainframe computers, distributed computing environments that include any of the above systems or devices, and the like. Such systems or devices may accept input from the user in any way, including from input devices such as a keyboard or pointing device, via gesture input, proximity input (such as by hovering), and/or via voice input.

Examples of the disclosure may be described in the general context of computer-executable instructions, such as program modules, executed by one or more computers or other devices in software, firmware, hardware, or a combination thereof. The computer-executable instructions may be organized into one or more computer-executable components or modules. Generally, program modules include, but are not limited to, routines, programs, objects, components, and data structures that perform particular tasks or implement particular abstract data types. Aspects of the disclosure may be implemented with any number and organization of such components or modules. For example, aspects of the disclosure are not limited to the specific computer-executable instructions or the specific components or modules illustrated in the figures and described herein. Other examples of the disclosure may include different computer-executable instructions or components having more or less functionality than illustrated and described herein. Examples of the disclosure may also be practiced in distributed computing environments where tasks are performed by remote processing devices that are linked through a communications network. In a distributed computing environment, program modules may be located in local and/or remote computer storage media including memory storage devices.

The examples illustrated and described herein as well as examples not specifically described herein but within the scope of aspects of the disclosure constitute example means for managing one or more resources in a cloud-computing environment. For example, the elements illustrated in FIGS. 1, 2, and/or 3, such as when encoded to perform the operations illustrated in FIGS. 5 and 6 constitute at least an example means for receiving a template; an example means for identifying a resource; an example means for generating a call for data associated with a resource; an example means for determining whether a resource is associated with a product; an example means for identifying a feature associated with a resource; an example means for determining whether a feature satisfies a parameter; an example means for determining whether a resource is accessible to a client device; and an example means for transmitting data associated with a resource for presentation to a user.

The order of execution or performance of the operations in examples of the disclosure illustrated and described herein is not essential, unless otherwise specified. That is, the operations may be performed in any order, unless otherwise specified, and examples of the disclosure may include additional or fewer operations than those disclosed herein. For example, it is contemplated that executing or performing a particular operation before, contemporaneously with, or after another operation is within the scope of aspects of the disclosure.

When introducing elements of aspects of the disclosure or the examples thereof, the articles "a," "an," "the," and "said" are intended to mean that there are one or more of the elements. The terms "comprising," "including," and "having" are intended to be inclusive and mean that there may be additional elements other than the listed elements. The phrase "one or more of the following: A, B, and C" means "at least one of A and/or at least one of B and/or at least one of C."

Having described aspects of the disclosure in detail, it will be apparent that modifications and variations are possible without departing from the scope of aspects of the disclosure as defined in the appended claims. As various changes could be made in the above constructions, products, and methods without departing from the scope of aspects of the disclosure, it is intended that all matter contained in the above description and shown in the accompanying drawings shall be interpreted as illustrative and not in a limiting sense.

Alternatively or in addition to the other examples described herein, examples include any combination of the following:

associating a plurality of resources with a plurality of stockkeeping units;

generating a meter that maps a constraint between a client device and a resource;

receiving a template including a plurality of parameters associated with a plurality of products;

receiving a template associated with a cloud-based service;

identifying a resource;

identifying a plurality of resources configured to perform at least a portion of a cloud-based service in accordance with a plurality of parameters;

identifying a resource provider corresponding to a resource;

generating a call for data associated with a resource;

retrieving data associated with a resource;

receiving data associated with a resource;

storing data associated with a resource;

determining whether a resource location is accessible to a client device;

determining whether a resource is accessible to a client device;

determining whether a resource is associated with a product;

identifying a feature associated with a first resource;

determining whether a feature satisfies a parameter;

transmitting data associated with a resource for presentation to a user;

a call component configured to receive a template including a plurality of parameters associated with a plurality of products;

a call component configured to identify a resource configured to satisfy at least a portion of a plurality of parameters;

a call component configured to generate a call for data associated with a resource;

a call component configured to determine whether a resource is a previously-deployed resource;

a call component configured to generate a call for data;

a call component configured to associate a resource with a stockkeeping unit;

a call component configured to generate a meter that maps a constraint between a client location and a resource location;

a manager component configured to identify a feature associated with a resource;

a manager component configured to determine whether a feature is accessible to a client device; and a manager component configured to transmit data associated with a resource for presentation to a user.

In some examples, the operations illustrated in the drawings may be implemented as software instructions encoded on a computer readable medium, in hardware programmed or designed to perform the operations, or both. For example, aspects of the disclosure may be implemented as a system on a chip or other circuitry including a plurality of interconnected, electrically conductive elements.

While the aspects of the disclosure have been described in terms of various examples with their associated operations, a person skilled in the art would appreciate that a combination of operations from any number of different examples is also within scope of the aspects of the disclosure.

What is claimed is:

1. A computer-implemented method for providing cloud computing services to users from a cloud computing system, comprising:
    receiving, from a client device of a user, a template including a plurality of performance parameters associated with a cloud computing service to be provided from the cloud computing system to the user via a computer network, the client device being associated with a client location;
    based on the client location, identifying, at the cloud computing system, a cloud computing resource of the cloud computing system that is accessible to the client device at the client location, the cloud computing resource having a stock keeping unit assigned by a service administrator of the cloud computing system and associated with a set of features of the cloud computing resource, the stock keeping unit being selected by the service administrator as being associated with a subscription plan and available to the user based on a subscription tier of the user such that the user has access to the cloud computing resource corresponding to the stock keeping unit while another user does not have access to the same cloud computing resource; and
    upon identifying the cloud computing resource that is suitable for providing the one or more of the cloud computing services,
        identifying one or more of the set of features associated with the identified cloud computing resource based on the stock keeping unit corresponding to the identified cloud computing resource;
        determining whether the identified one or more of the set of features satisfies one or more of the performance parameters in the received template; and
        in response to determining that the identified one or more of the set of features satisfies one or more of the performance parameters, transmitting, to the client device and via the computer network, data associated with the identified cloud computing resource for selection by the user and deploying the identified cloud computing resource in the cloud computing system upon user selection.

2. The computer-implemented method of claim 1, further comprising:
    identifying a resource provider corresponding to the cloud computing resource;
    retrieving, from the resource provider, data associated with the cloud computing resource; and
    storing, in a cache, the retrieved data.

3. The computer-implemented method of claim 1, further comprising:
    identifying a resource provider corresponding to the cloud computing resource;
    generating a call to the resource provider for data associated with the cloud computing resource;
    and receiving, from the resource provider, the data associated with the cloud computing resource.

4. The computer-implemented method of claim 1, wherein identifying the cloud computing resource comprises determining whether a resource location of the cloud computing resource is accessible to the client device based on the client location, wherein the cloud computing resource is identified in response to determining that the resource location is accessible to the client device.

5. The computer-implemented method of claim 1, further comprising:
    receiving, from the client device, another template including additional plurality of performance parameters associated with the one or more cloud computing services; and
    retrieving, from a resource provider, data associated with another cloud computing resource different from the cloud computing resource.

6. The computer-implemented method of claim 1, further comprising:
    receiving, from the client device, another template including additional plurality of performance parameters associated with the one or more cloud computing services; and
    retrieving, from a cache, data associated with another cloud computing resource different from the cloud computing resource.

7. The computer-implemented method of claim 1, further comprising associating a plurality of cloud computing resources with a plurality of stock keeping units, the plurality of cloud computing resources including the cloud computing resource, the plurality of stock keeping units including the stock keeping unit that corresponds to the cloud computing resource.

8. The computer-implemented method of claim 1, further comprising generating a meter that maps a constraint between the client location and a resource location of the cloud computing resource.

9. A computing device in a cloud computing system, comprising:
    a processor; and
    a memory containing instructions executable by the processor to cause the computing device to:
        upon receiving, from a client device of a user, a template including a performance parameter associated with a cloud computing service to be provided from the cloud computing system to the user via a computer network, identify, based on a client location of the client device, a cloud computing resource of the cloud computing system that is accessible to the client device at the client location, the cloud computing resource having a corresponding stock keeping unit assigned by a service administrator of the cloud computing system and corresponding to a set of capabilities of the cloud computing resource, the stock keeping unit being selected by the service administrator as being associated with a subscription plan and available to the user based on a subscription tier of the user such that the user has access to the cloud computing resource corresponding to the stock keeping unit while another user does not have access to the same cloud computing resource; and upon identifying the cloud computing resource that is suitable for providing the one or more of the cloud computing services, determine, based on the stock keeping unit, whether one of the set of capabilities of the identified cloud computing resource satisfies the performance parameter in the received template; and in response to determining that the one of the capabilities satisfies the performance parameter, transmit, to the client device and via the computer network, data associated with the identified cloud computing resource for selection by the user and deploy the identified cloud computing resource in the cloud computing system upon user selection.

10. The computing device of claim 9 wherein the memory contains additional instructions executable by the processor to cause the computing device to:

upon receiving, from the client device of the user, the template, identify a resource provider corresponding to the cloud computing resource;

retrieve, from the resource provider, data associated with multiple cloud computing resources provided by the resource provider; and identify the cloud computing resource based on the retrieved data.

11. The computing device of claim 9 wherein the memory contains additional instructions executable by the processor to cause the computing device to:

upon receiving, from the client device of a user, the template, identify a resource provider corresponding to the cloud computing resource;

generate a function call to the identified resource provider for data associated with multiple cloud computing resources provided by the resource provider;

receive, from the resource provider, the data associated with multiple cloud computing resources provided by the resource provider; and identify the cloud computing resource based on the retrieved data.

12. The computing device of claim 9 wherein the memory contains additional instructions executable by the processor to cause the computing device to:

receive, from the client device, another template including another performance parameter associated with the cloud computing service; and retrieve, from another resource provider, data associated with another cloud computing resource different from the identified cloud computing resource.

13. The computing device of claim 9 wherein the memory contains additional instructions executable by the processor to cause the computing device to:

receive, from the client device, another template including another performance parameter associated with the cloud computing service; and retrieve, from a cache on the computing device, data associated with another cloud computing resource different from the identified cloud computing resource.

14. A computer-implemented method for providing cloud computing services to users from a cloud computing system, the method comprising:

upon receiving, from a client device of a user, a template including a performance parameter associated with a cloud computing service to be provided from the cloud computing system to the user via a computer network, identifying, based on a client location of the client device, a cloud computing resource of the cloud computing system that is accessible to the client device at the client location, the cloud computing resource having a corresponding stock keeping unit assigned by a service administrator of the cloud computing system and corresponding to a capability of the cloud computing resource, the stock keeping unit being selected by the service administrator as being associated with a subscription plan and available to the user based on a subscription tier of the user such that the user has access to the cloud computing resource corresponding to the stock keeping unit while another user does not have access to the same cloud computing resource; and upon identifying the cloud computing resource that is suitable for providing the one or more of the cloud computing services, determining, based on the stock keeping unit, whether the capability of the identified cloud computing resource satisfies the performance parameter in the received template; and in response to determining that the capability satisfies the performance parameter, transmitting, to the client device and via the computer network, data associated with the identified cloud computing resource for selection by the user and deploying the identified cloud computing resource in the cloud computing system upon user selection.

15. The method of claim 14, further comprising:

upon receiving, from the client device of the user, the template, identifying a resource provider corresponding to the cloud computing resource;

retrieving, from the resource provider, data associated with multiple cloud computing resources provided by the resource provider; and identifying the cloud computing resource based on the retrieved data.

16. The method of claim 14, further comprising:

upon receiving, from the client device of a user, the template, identifying a resource provider corresponding to the cloud computing resource;

generating a function call to the identified resource provider for data associated with multiple cloud computing resources provided by the resource provider;

receiving, from the resource provider, the data associated with mltiple cloud computing resources provided by the resource provider; and identifying the cloud computing resource based on the retrieved data.

17. The method of claim 14, further comprising:

receiving, from the client device, another template including another performance parameter associated with the cloud computing service; and in response to receiving the another template, retrieving, from another resource provider, data associated with another cloud computing resource different from the identified cloud computing resource.

18. The method of claim 14, further comprising:

receiving, from the client device, another template including another performance parameter associated with the cloud computing service; and in response to receiving the another template, retrieving, from a cache on the computing device, data associated with another cloud computing resource different from the identified cloud computing resource.

* * * * *